Patented June 27, 1933

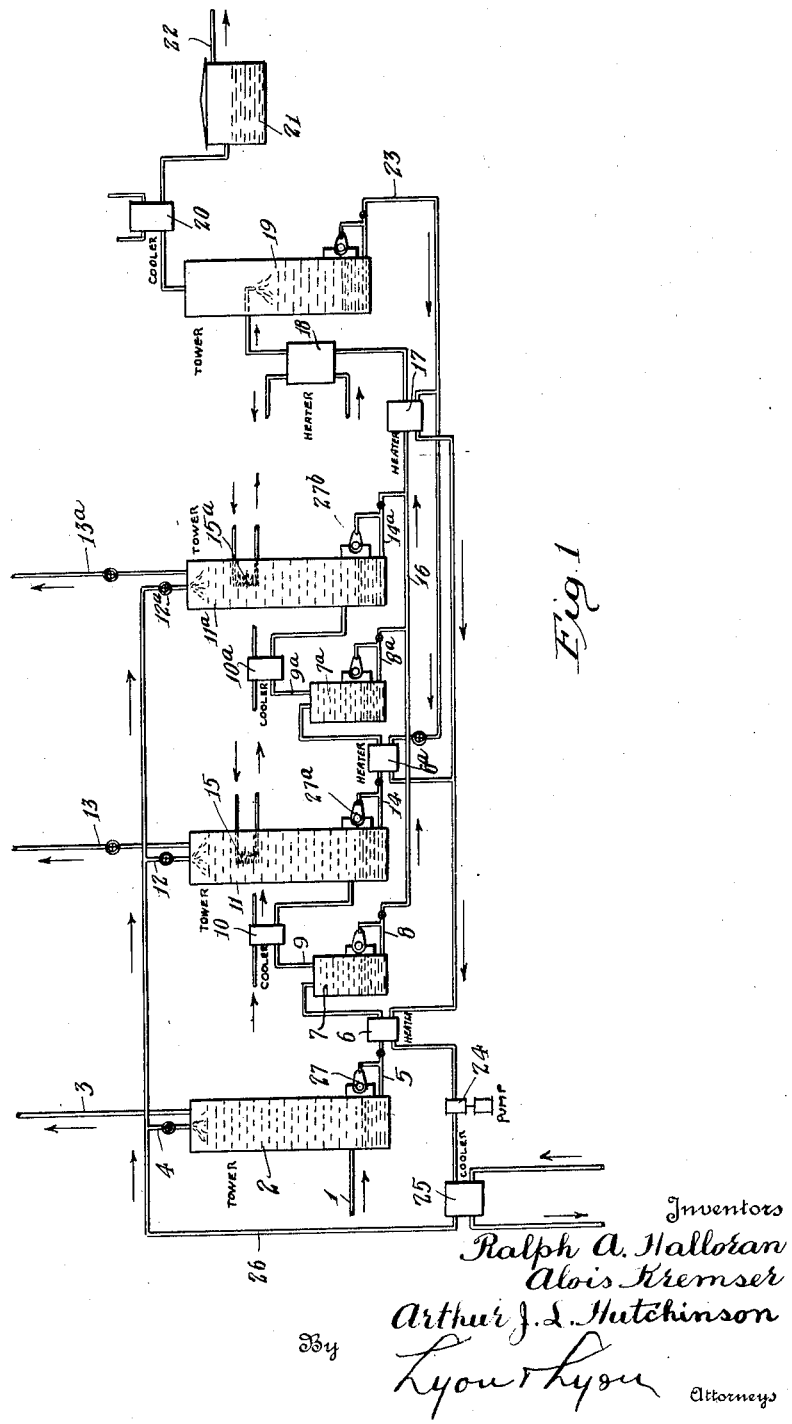

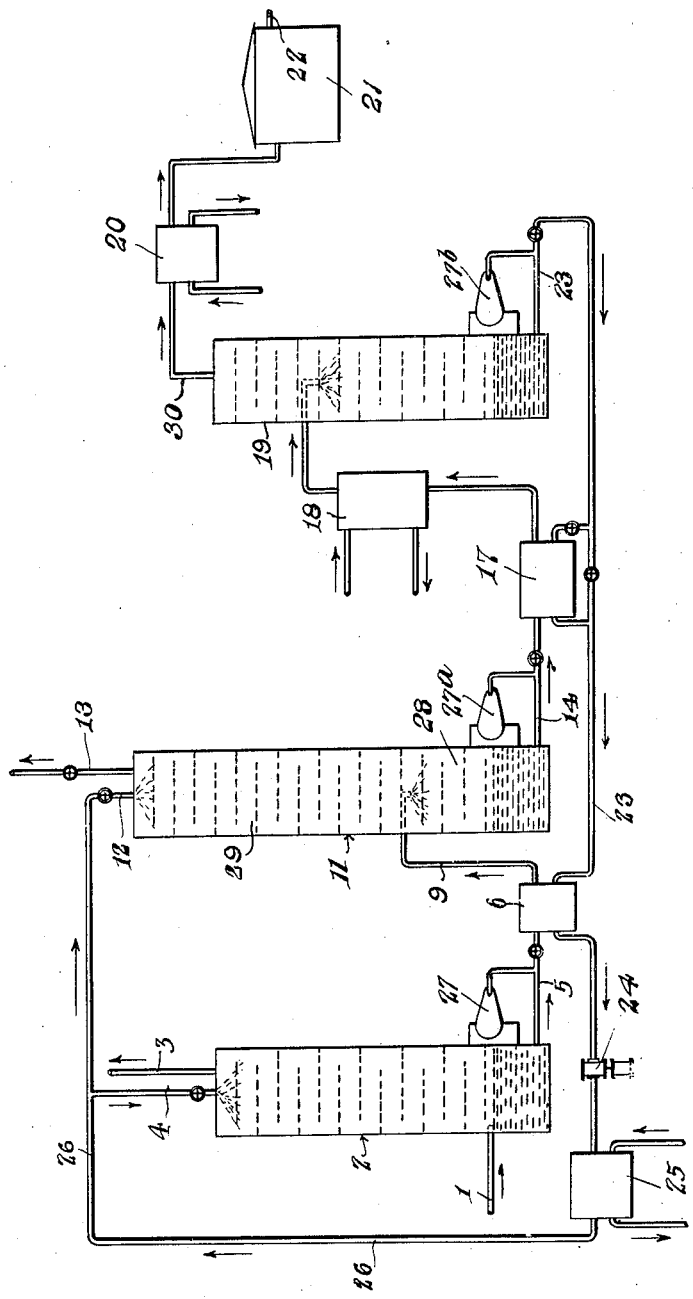

1,915,781

UNITED STATES PATENT OFFICE

RALPH A. HALLORAN AND ALOIS KREMSER, OF BERKELEY, AND ARTHUR J. L. HUTCHINSON, OF LOS ANGELES, CALIFORNIA, ASSIGNORS TO STANDARD OIL COMPANY OF CALIFORNIA, OF SAN FRANCISCO, CALIFORNIA, A CORPORATION OF DELAWARE

PROCESS OF FRACTIONATION BY MULTIPLE ABSORPTION

Application filed August 23, 1927. Serial No. 214,840.

This invention relates to a process for the separation of valuable components from a mixture of hydrocarbon gases or vapors by absorption in oil. More particularly it applies to the recovery of gasoline fractions from oil well gases, still gases, etc.

An object of this invention is to disclose a process of separating or fractionating mixtures of hydrocarbons by absorption in a suitable medium.

Another object is to disclose a process of fractionating mixtures of hydrocarbons by multiple absorption at lower pressures than are required in a normal rectifying column.

Another object is to disclose a process of removing undesirable hydrocarbons from mixtures thereof without loss of desirable hydrocarbons.

The process of the present invention is based upon the variable solubility of light hydrocarbons in mineral oil or other miscible liquid of higher boiling point. The hydrocarbons, for example the series from methane to octane, are all soluble in heavy hydrocarbon liquid, but in proportion decreasing with decrease in molecular weight of the hydrocarbons. If natural gas and hydrocarbon oil are brought into intimate contact for a sufficient period of time, equilibrium will be established, and a new liquid-phase and gaseous-phase will be formed. Most of the octane, heptane, hexane, pentane and butane will be found in the liquid phase, and most of the methane, ethane and propane in the gas phase. The phase compositions will vary with temperature and pressure. The lower the temperature and the higher the pressure the larger the proportion of all hydrocarbons in the liquid phase. In actual operation the resultant composition of the gas and liquid phases is influenced by the relative amounts of gas and liquid in the system and the design of the contacting means employed, for example, the number and design of the plates or grids in the column. Another factor influencing the resultant composition of liquid and gas phases is the composition of the gas entering the system and the composition of the hydrocarbon liquid used as absorbent.

When a heavy oil which has been used to absorb hydrocarbons from a gaseous mixture as described above is heated to evaporate a portion of the absorbed constituents, the factors determining the composition of the resulting liquid and gas phases are again, pressure, temperature, initial composition, etc. The interrelation of these factors, whether it be in connection with absorption or evaporation, is well understood by those skilled in the art and the results desired in any particular case may be obtained by proper control of these factors.

As a specific example, if a mixture of gaseous hydrocarbons is contacted with a heavier liquid hydrocarbon oil varying proportions of the gaseous hydrocarbons are absorbed in the liquid. Ordinarily the so-called casinghead gases from oil wells consist principally of methane and ethane but contain some propane, butane and pentane along with minor quantities of heavier hydrocarbons. If such a gas is contacted in a tower with an oil containing only hydrocarbons of considerably higher series than pentane, conditions of temperature, pressure and oil rate may be adjusted so as to absorb, for example, 50% of the butane from the casinghead gas. Under these conditions there will at the same time be absorbed 21% of the propane and 76% of the pentane. However, under different conditions, for example in a tower containing a greater number of plates it may be possible to absorb 50% of the butane, 13% of the propane and substantially 100% of the pentane. Again, conditions may be so adjusted as to absorb 90% of the butane, 25% of the propane and substantially 100% of the pentane. If the enriched oil from this tower is then heated under the proper conditions it will be possible to evaporate, for example, 50% of the absorbed butane and at the same time 10% of the absorbed pentane and substantially 100% of the absorbed propane.

The process of the present invention is based upon relations and principles such as have been described and illustrated above. It comprises a multiple absorption process characterized by first contacting an absorber oil and gaseous hydrocarbon mixture followed by partly separating by distillation or reduction of pressure alone of the absorbed fractions from the absorber oil, subjecting the vapors from this distillation to a second absorption step with fresh absorber oil, distilling the enriched absorber oil from the second absorption, contacting the vapors produced by this distillation with fresh absorber oil, and so on, repeating this operation as many times as desired, and finally combining the enriched absorber oil from each step in the process and subjecting the same to distillation to remove all absorbed fractions. By means of this process there is accomplished by the aid of the property of selective absorption in each step the successive rejection of lighter and undesirable hydrocarbon fractions, and the successive absorption of heavier desirable hydrocarbon fractions, thereby obtaining in the system a progressively increasing ratio of desirable to undesirable constituents. A final step consists in the separation of desirable fractions from the absorption oil. This absorption oil may thus be reused and the process may be carried out without loss of absorption oil. In order that the present process may be better understood there are attached hereto two drawings which represent in diagrammatic cross-section forms of apparatus in which the process may be carried out.

An example of the operation of this invention as carried out in apparatus of the type shown in Figure 1 follows: In this example we are assuming that the gas to be treated is of the type commonly known as casinghead. We assume, further, for the sake of illustration, that it contains mostly very low boiling point hydrocarbons such as methane and ethane. In addition it contains a small quantity of propane, butane and pentane, together with a trace of heavier hydrocarbons. It is desired to recover from the gases all of the pentane and heavier constituents and reject all of the propane and lighter constituents. In other words, the dividing line in this example is to be at butane. Further, the percentage of butane which may be included in gasoline without rendering it unduly "wild" is high so that it is our purpose to recover most of the butane from the gas which is processed.

In the apparatus of Figure 1 the gas to be processed is considered to enter the system through line 1. This line enters the tower 2 at a point near the bottom, i. e. not much above the liquid level. In the upper part of the tower are bubble cap plates or other means for bringing about efficient contact between the gaseous and liquid materials passing therethrough. Near the top of the tower the line 4 enters and through it is sprayed a suitable absorber stock. This oil works its way down through the tower countercurrent to the gases. Conditions in the system are so regulated, for the purposes of this example, that the oil absorbs from the gases for example about 25% of the propane, 90% of the butane, and substantially 100% of the pentane and heavier hydrocarbons which it contains. The gas leaving the tower through line 3 will, therefore, contain substantially none of the pentane, 10% of the butane, 75% of the propane, and the major portion of the hydrocarbons lighter than propane contained in the original gas which entered the tower through line 1. The oil which collects in the base of the tower is withdrawn through the line 5, through a heat exchanger 6 where its temperature is raised. At this raised temperature the oil enters the top of the chamber 7 where evaporation of a part of the absorbed hydrocarbon takes place. Conditions are so regulated in this example that evaporation of substantially all of the propane, 50% of the butane and 10% of the pentane carried by the absorber stock takes place. The remaining liquid flows from the drum 7 through line 8, into a collecting line 16.

The vapors leave the drum 7 through line 9, pass through cooler 10 and enter the second absorber tower 11, which may be similar in construction and operation to the first absorber 2. Fresh sponge oil enters through line 12 and flows downward over a series of plates, baffles or the like, countercurrent to the gases. In this absorber conditions are so regulated that the previous absorption is repeated, i. e. the sponge oil removes 25% of the propane, 90% of the butane and substantially 100% of all heavier hydrocarbons from the gas which enters. A cooling coil 15 in the tower 11 may be used to cool the absorber stock, thus removing part of the heat of absorption. The absorber oil containing the absorbed fractions collects in the base of the tower and flows through line 14 and heat exchanger 6—A, to a drum 7—A, similar to the drum 7. The operation already described in drum 7 and tower 11 is then repeated in drum 7—A and tower 11—A. The line 16 serves to collect the oil from the evaporators 7 and 7—A and the tower 11—A. This oil, as has been stated, consists of the sponge stock containing some butane and heavier hydrocarbons but no lighter one. It is further heated in the exchanger 17 and the heater 18 and is then introduced into a distillation chamber or tower 19 of any suitable design. There the heat is sufficient to vaporize all of the absorbed hydrocarbons, but is insufficient to vaporize the sponge oil. In other words, separation is effected between the absorbent and absorbed hydrocarbons. The former is withdrawn from the bottom through the line 23 and is recycled to the system by means of a pump 24. The latter is removed as a vapor, condensed in the cooler 20 and collected in the tank 21 from which it may be withdrawn as desired through line 22. The hot sponge oil from tower 19 may be diverted through heat exchangers 17, 6—A and 6, the function of which has already been described. It may be desirable to cool the oil still further before it enters the absorption towers. This is done by passing it through a cooler 25. 27, 27a and 27b are liquid level regulating means of any suitable type.

In order to make clear the results which may be obtained by the practice of the present invention, as described in the above example, the following table is inserted. This table shows the percent of pentane, butane and propane in the gaseous and liquid phases of the system at each stage of the operation as described.

|  | Absorber | | Evaporator | |
|---|---|---|---|---|
|  | Absorbed | Lost | Vaporized | Retained |
| *Pentane* | | | | |
| Content of gas entering—100.00 | | | | |
| First absorber | 100 | 0 | | |
| First evaporator | | | 10 | 90 |
| Second absorber | 10 | 0 | | |
| Second evaporator | | | 1 | 9 |
| Third absorber | 1 | 0 | | |
| To final distillation—100.00 | | | | |
| Loss | | 0 | | |
| *Butane* | | | | |
| Content of gas entering—100.00 | | | | |
| First absorber | 90 | 10 | | |
| First evaporator | | | 45 | 45 |
| Second absorber | 40.5 | 4.5 | | |
| Second evaporator | | | 20.25 | 20.25 |
| Third absorber | 18.22 | 2.03 | | |
| To final distillation—83.47 | | | | |
| Loss | | 16.53 | | |
| *Propane* | | | | |
| Content of gas entering—100.00 | | | | |
| First absorber | 25 | 75 | | |
| First evaporator | | | 25 | 0 |
| Second absorber | 6.25 | 18.75 | | |
| Second evaporator | | | 6.25 | 0 |
| Third absorber | 1.56 | 4.69 | | |
| To final distillation—1.56 | | | | |
| Loss | | 98.44 | | |

As a result of the operation of the present invention as above exemplified it will be apparent that the final recovery consists of 100% of the pentane, 83.47% of the butane and 1.56% of the propane contained in the gas entering the system.

The example given above is based upon the rejection of propane and lighter hydrocarbons and the recovery of pentane and heavier hydrocarbons. That is, the line of division occurs in the intermediate or butane component, which is partly retained and partly rejected. The inclusion of large amounts of propane and lighter hydrocarbons would render the recovered gasoline excessively "wild", whereas commercial gasoline may contain relatively large amounts of butane without dangerous or objectionable raising of the vapor pressure thereof. However, the process of the present invention may be applied to the separation of a hydrocarbon mixture at any point desired.

Figure 2 illustrates an alternative method of carrying out this process. The principle used is the same as that used in the above described embodiment of this invention. The "rich" gases to be treated enter a tower 2 through line 1. In this tower they are contacted with a sponge oil which enters through line 4. The stripped or "lean" gas leaves the tower by line 3, while the sponge and absorbed fractions are withdrawn from the bottom of the tower through the line 5. This line passes through a heat exchanger 6 and thence by line 9 into the tower 11. The lower part of this tower designated by 28, serves as an evaporator. The vaporized portion passes upward through the tower and in so doing is contacted with the downflowing sponge oil. The upper portion of the tower, designated by 29, therefore, serves as an absorber. The stripped gas leaves the tower through the line 13, and the sponge oil containing absorbed fractions is withdrawn through the line 14, the heat exchanger 17 and the heater 18. The heated oil then passes into a tower 19, where the absorbed fractions are vaporized and the sponge stock remains liquid. The vapors leave the tower through the line 30 at the top of the tower and are condensed in the cooler 20 and then collected in tank 21. The sponge oil is withdrawn from the bottom of the tower through line 23 and is recycled by means of pump 24 and pipe means 26 for reuse in the absorption operation. In so doing it is first passed (all or in part) through the heat exchangers 17 and 6 and then through cooler 25 to bring it approximately to cooling water temperature. The towers 2, 11 and 19 are understood to contain suitable contacting means, such as bubble cap plates or the like.

The process just described is a simplified form of that described as carried out in the apparatus illustrated in Figure 1. The progressive rejection of lighter hydrocarbons (removed through lines 3 and 13) and the progressive absorption of the intermediate hydrocarbon (in this case butane) in the sponge oil together with the final separation of absorbed hydrocarbons from sponge oil are in accordance with the principles explained in the previous example. The advantages, likewise, are the same.

An advantage of our process which will be apparent from reading the above described examples, lies in the fact that no heat is lost from the re-evaporation steps (except the small amount absorbed in cooling the vapors). Instead it is conserved and made a part of that required for the final distillation of the sponge or absorption oil.

Processes in accordance with principles of rectification must use for the requisite separation of light undesirable hydrocarbons from heavier desirable ones either normal temperatures and high pressures, or if relatively low pressures are used, temperatures below atmospheric are required. The present invention is much more flexible as regards the choice of pressure and temperatures. The process is not subject to the high temperature or low pressure limitations required for normal fractionating processes.

By absorption of lighter hydrocarbons in a heavier hydrocarbon we mean absorption by solution in said heavier hydrocarbon or any other liquid and by entrapment or by any other means. Our patent is not to be limited to any particular design or form of equipment but may be used in any equipment capable of accomplishing the purposes of this invention in the manner described.

It is to be understood that the principles above described as constituting the advance of this process over the usual practice, permit of extensive variations. The pressure, temperature, oil rate, apparatus, etc., may be varied in accordance with the well known influence of each upon the absorption and separation of any particular gaseous hydrocarbon mixture from which it is desired to recover certain constituents. The choice of conditions will, therefore, depend upon the composition of the gases or vapors handled and upon the separation which the operator may desire to obtain in any particular case. By means of our process the separation of any mixture of hydrocarbons may be obtained, whether the line of demarkation is butane as in the above examples or dodecane or any other hydrocarbon or series thereof.

We claim:

1. A multiple absorption process comprising, contacting hydrocarbon vapors with an absorptive medium, vaporizing a part of the absorbed hydrocarbons, contacting such vapors with fresh absorptive medium, revaporizing absorbed hydrocarbons and contacting said vapors with fresh absorptive medium, and then combining absorptive media containing absorbed hydrocarbons and removing said hydrocarbons therefrom.

2. A process of fractionating mixtures of hydrocarbon vapors containing very volatile components undesired in the final product, less volatile components desired in the final product, and intermediate components, comprising: selectively absorbing all of the desired, a major portion of the intermediate, and a minor portion of the undesired hydrocarbon components in an absorptive medium, while withdrawing a major portion of the undesired and a minor portion of the intermediate components in vapor form from the system; revaporizing all of the undesired components, a large portion of the intermediate components and but a minor portion of the desired components from said absorptive medium; recontacting said revaporized components with fresh absorptive medium to absorb all of the desired, substantially all of said intermediate and but a minor portion of said undesired revaporized components in said fresh absorptive medium while withdrawing substantially all of said undesired and a minor portion of said intermediate components thus revaporized in vapor form from the system; again revaporizing all of the undesired, a part of the intermediate and a minor portion of the desired components from the last named fresh absorptive medium; again recontacting said again revaporized components with still another fresh absorptive medium to absorb substantially all of said desired and intermediate components while withdrawing said undesired components from the system in vapor form; combining said absorptive media with absorbed components therein and separating said absorbed components from said combined absorptive media.

3. A process of fractionating mixtures of hydrocarbon vapors containing very volatile components undesired in the final product, less volatile components desired in the final product, and intermediate components, comprising: selectively absorbing all of the desired, a major portion of the intermediate, and a minor portion of the undesired hydrocarbon components in an absorptive medium, while withdrawing a major portion of the undesired and a minor portion of the intermediate components in vapor form from the system; revaporizing all of the undesired components, a large portion of the intermediate components and but a minor portion of the desired components from said absorptive medium, recontacting said revaporized components with fresh absorptive medium to absorb all of the desired, substantially all of said intermediate and but a minor portion of said undesired revaporized components in said fresh absorptive medium, while withdrawing substantially all of said undesired and a minor portion of said intermediate components thus revaporized in vapor form from the system; again revaporizing all of the undesired and a part of the intermediate components from the last named fresh absorptive medium; again recontacting said again revaporized components with still another fresh absorptive medium to absorb substantially all of said intermediate components while withdrawing said undesired components from the system in vapor form; combining said absorptive media with absorbed desired and intermediate components therein and separating said absorbed components from said combined absorptive media.

Signed at Los Angeles, this 12th day of August 1927.

RALPH A. HALLORAN.
ALOIS KREMSER.
ARTHUR J. L. HUTCHINSON.